United States Patent [19]

Georges et al.

[11] 4,419,079
[45] Dec. 6, 1983

[54] AIRCRAFT PILOTING AID SYSTEM

[75] Inventors: Jean-François M. Georges, Ville d'Avray; Roger Parus, Saint-Remy-les-Chevreuse, both of France

[73] Assignees: Avions Marcel Dassault-Breguet Aviation, Vaucresson; Thomson-CSF, Paris, both of France

[21] Appl. No.: 284,666

[22] Filed: Jul. 20, 1981

[30] Foreign Application Priority Data

Jul. 23, 1980 [FR] France ............... 80 16234

[51] Int. Cl.³ .............................................. G09B 9/08
[52] U.S. Cl. ............................. 434/43; 340/27 NA; 358/104; 434/241; 434/243
[58] Field of Search ............ 434/35, 36, 43, 239–244, 434/44, 57; 340/27 NA; 358/104

[56] References Cited

U.S. PATENT DOCUMENTS

| | | | |
|---|---|---|---|
| 3,327,407 | 6/1967 | Barnes | 434/43 |
| 3,711,826 | 1/1973 | La Russa | 434/43 |
| 3,784,969 | 1/1974 | Wilckens et al. | 340/27 NA |
| 3,999,007 | 12/1976 | Crane | 434/43 |
| 4,057,782 | 11/1977 | Muller | 340/27 NA |
| 4,147,056 | 4/1979 | Muller | 340/27 NA |
| 4,241,519 | 12/1980 | Gilson et al. | 434/43 |
| 4,283,705 | 8/1981 | James et al. | 340/27 NA |
| 4,326,189 | 4/1982 | Crane | 340/27 NA |
| 4,368,517 | 1/1983 | Lovering | 434/43 |

FOREIGN PATENT DOCUMENTS

| | | |
|---|---|---|
| 2128387 | 10/1972 | France . |
| 2334141 | 7/1977 | France . |
| 2389535 | 2/1978 | France . |
| 819456 | 9/1959 | United Kingdom . |

*Primary Examiner*—Vance Y. Hum
*Assistant Examiner*—Leo P. Picard
*Attorney, Agent, or Firm*—Watson, Cole, Grindle & Watson

[57] ABSTRACT

A piloting aid system for displaying symbols representative of determined characteristics of the flight of an aircraft and representative of its environment is disclosed. The symbols are displayed on the screen of a display unit which displays a symbol representing the aircraft near a predetermined point on the display screen and a rectangular window for guiding the flight path of the aircraft. The sides of the guidance window are parallel to mutually perpendicular axes provided on the screen. The abscissa and ordinate of the predetermined point are respectively proportional to the drift and to the slope relative to the ground of the aircraft flight path.

11 Claims, 12 Drawing Figures

AIRCRAFT PILOTING AID SYSTEM

BACKGROUND OF THE INVENTION

Field of the Invention

The present invention relates to a piloting aid system of aiding in piloting, or in simulating the piloting of an aircraft and more particularly of an airplane.

Already known are various types of airplane piloting aid systems, which include a display unit and means for displaying thereon symbols representative of determined characteristics of the aircraft's flight and of its environment. Most such known piloting aid systems are rather rugged and unsatisfactory, however. In most known systems, the longitudinal axis of the airplane is used for guidance thereof and is represented for example by a cross or any other symbol on the display screen, and in the event of manual piloting the pilot must endeavor to cause this cross to register with other displayed elements or symbols representing determined characteristic ground features. Such piloting aid systems have the disadvantage arising from the fact that the instantaneous direction of flight of the airplane rarely coincides with the direction of the airplane's longitudinal axis; accordingly, in order to follow a determined path, the pilot is compelled to take into account both the drift and the incidence angle of the airplane. Consequently the inadequacy and unreliability of these prior-art piloting aid systems will readily be appreciated.

SUMMARY OF THE INVENTION

On the basis of certain kinematic considerations and from experiments on flight simulators, the Applicants have found that it is possible and advantageous to provide means for displaying on the screen the airplane symbol in a position dependent on the speed of the center of gravity of the airplane relative to the ground.

A chief object of the present invention is to achieve a piloting aid system comprising means for displaying a symbol representing the airplane near a point on the display screen the abscissa and ordinate of which with respect to two mutually perpendicular axes are respectively proportional to the drift $\delta$ and to the slope $\gamma_S$ of the aircraft flight path relative to the ground, and means for displaying a guidance symbol for the aircraft flight path such as a rectangular window having sides respectively parallel to said mutually perpendicular axes.

The piloting aid system of this invention offers a number of very important advantages over prior-art piloting aid systems, and the following in particular: since the displayed position of the aircraft symbol effectively depends on the direction of the aircraft velocity relative to the ground and not on the actual orientation of the aircraft longitudinal axis, which may differ significantly from the direction of the aircraft velocity, the use of such aircraft symbol in association with the flight path guidance symbol, such as a rectangular window, is much easier and provides far more effective piloting aid inasmuch as the pilot may take direct account of the aircraft symbol for his piloting maneuvers without the need to make mental corrections to allow for the difference between the direction of the aircraft longitudinal axis and the direction of the aircraft velocity relative to the ground. Further, instead of having to cause the midpoint of the aircraft-symbolizing cross to register accurately with other likewise punctual displayed elements, as in the case of prior-art piloting aid systems, the pilot of an aircraft equipped with the piloting aid system of this invention has as his sole task, in the event of manual piloting, to maintain the aircraft symbol within the rectangular flight path guidance window. This task involves far simpler and far less critical maneuvers and therefore requires much less sustained concentration from the pilot. These two advantages of the piloting aid system according to this invention thus help considerably to facilitate manual piloting of the aircraft.

In a preferred embodiment of the piloting aid system according to the present invention, the aircraft symbol coordinates, which are respectively proportional to the drift angle $\delta$ and to the slope $\gamma_S$ of the aircraft flight path relative to the ground, are derived from an inertial guidance system installed in the aircraft. Means are further provided for displaying, in proximity to the aircraft symbol, at least one aircraft incidence characterizing symbol whose ordinate differs from that of the aircraft symbol by $K\Delta\alpha$, where K is a proportionality coefficient and $\Delta\alpha$ is the difference between the incidence of the aircraft and the incidence corresponding to the selected reference speed, and at least one potential-slope characterizing symbol whose ordinate is proportional to $$\gamma_P = \gamma_S + \frac{1}{g} \cdot \frac{dV_s}{dt},$$

where g is the intensity of gravitational force. In addition, means are preferably provided for displaying stationary for representing the aircraft pitch and yaw axes and means for displaying the $\delta$-drift angle axis in the form of a movable horizon line, preferably graduated in angular units of heading, such horizon line forming an angle with the pitch axis which is equal to the roll angle of the aircraft and its distance from the point of convergence of said stationary marks being proportional to the longitudinal inclination $\theta$ of the aircraft. Means may also be provided for displaying a realistic time-evolving image of a runway as it would be seen by the pilot of the aircraft.

This preferred embodiment of the piloting aid system according to this invention offers decisive advantages over aid systems of the same kind developed heretofore. In order to cause the aircraft to accurately follow the initially selected flight path, which is continuously symbolized on the display screen by the rectangular guidance window, it will suffice for the pilot firstly to maintain the aircraft symbol within said guidance window by means of the aircraft elevator and roll controls, and secondly to maintain the potential-slope characterizing symbol or symbols level with the incidence characterizing symbol or symbols by means of the manual engine throttle controls. The display screen provides a continuous presentation of:

(i) precise information concerning the aircraft flight: its roll angle $\phi$ about the roll axis is shown by the angle formed by the mobile horizon line with the stationary marks representing the aircraft axes; the distance between these stationary marks and said mobile horizon line represents the aircraft longitudinal inclination $\theta$; the relative positions of the displayed stationary marks and of the aircraft symbol provide a reading of the drift angle $\delta$ on the graduated scale along the mobile horizon line; this notably provides an effective aid in steering the aircraft flight path with a constant heading using a guidance window the ordinate of whose center is fixedly maintained on said horizon line; similarly the glide slope $\gamma_S$ relative to the ground can be deduced from the distance between the aircraft symbol and the horizon line, it being subsequently possible for a constant-slope guidance to be obtained by using a guidance window the ordinate of whose center, relative to the horizon line, is itself fixedly maintained; in particular, level flight is accomplished by continuously maintaining the aircraft symbol on said horizon line;

(ii) figurative information concerning the aircraft environment, particularly the ground environment; such figurative information is realistic enough, notably when consisting of a time-evolving image of an actual runway, for the pilot to be able to use it during the approach and landing phases involving the said actual runway.

It is especially easy for the pilot to take advantage of this symbology when the display unit of the piloting aid system of this invention comprises a cathode-ray tube. When such is the case, the display screen, and particularly the cathode-ray tube, is installed in the cockpit of the aircraft and optical means are provided for projecting said sceen in front of the pilot's eyes in a position such that the mobile horizon line, and possibly also the time-evolving runway image, coincide substantially with the horizon and with the runway which the pilot sees through the windshield of the aircraft. This embodiment is especially advantageous because it permits so-called "head-up" piloting, in which the image displayed before the pilot's eyes is either almost perfectly superimposed over the ground environment visible through the windshield in the event of good visibility, or serves as a substitute for that same environment.

By way of example, there is described hereinbelow, with reference to the accompanying drawings, an embodiment of an aircraft piloting aid system according to this invention, the embodiment being intended to be used as an aid for landing on a runway equipped with an Instrument Landing System (ILS) or like system.

BRIEF DESCRIPTION OF THE DRAWINGS

Various other objects, features and attendant advantages of the present invention will be more fully appreciated as the same becomes better understood from the following detailed description when considered in connection with the accompanying drawings, in which like reference characters designate like or corresponding parts through the several views and wherein:

FIGS. 2A and 2B are two portions respectively of the block diagram for the embodiment of a piloting aid system according to this invention;

FIGS. 6 through 10 depict the different presentations on the display screen, corresponding respectively to the successive phases of landing on a runway equipped with an ILS system; and FIG. 11 depicts the presentation on the display screen in the event of an aborted landing and subsequent go-around.

DETAILED DESCRIPTION OF THE PREFERRED EMBODIMENT

Figure 2B:
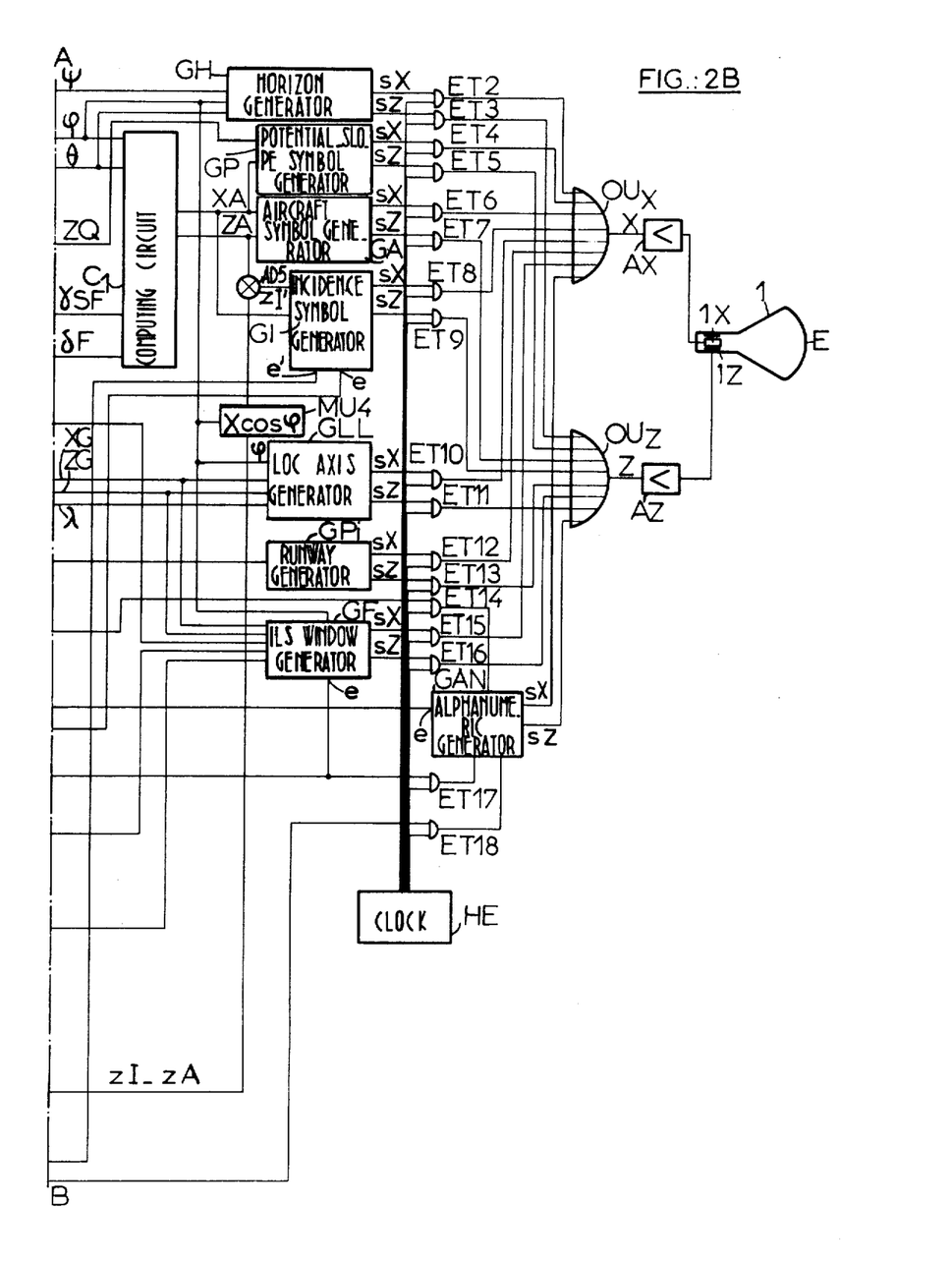
Figure 3:
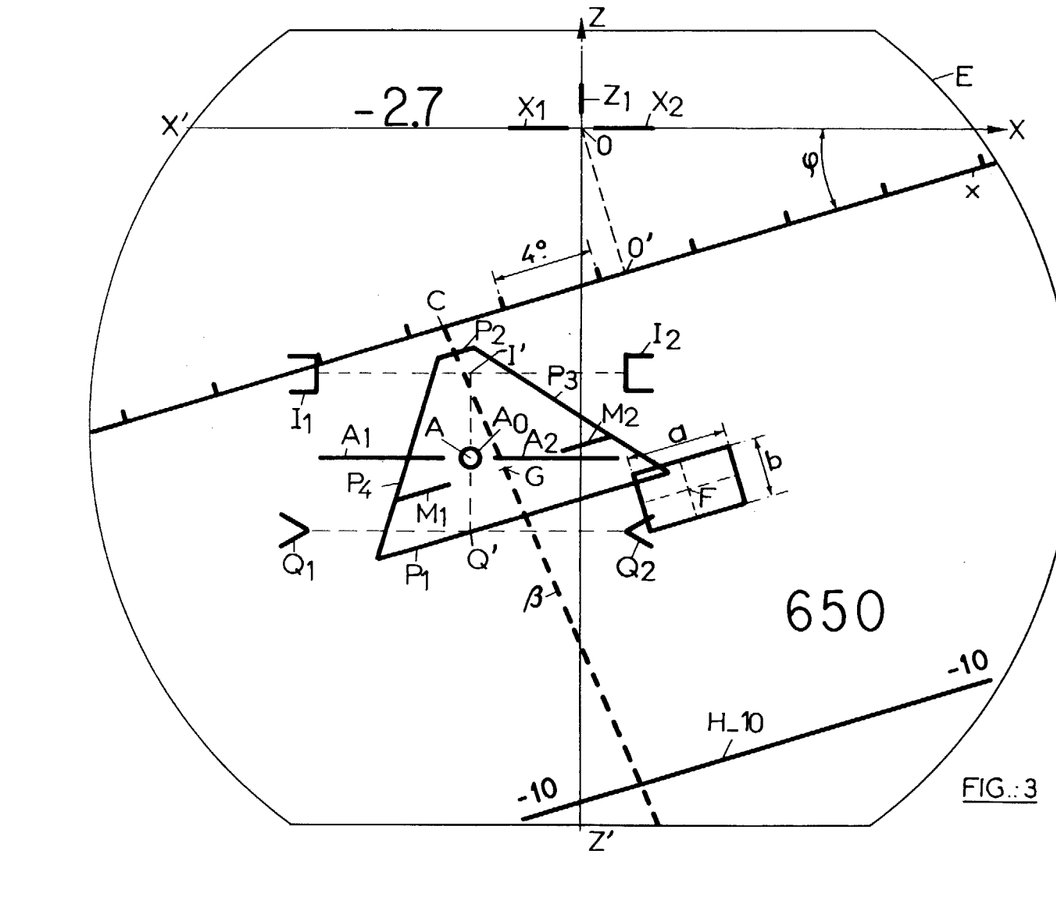
FIG. 3 depicts the dispaly screen associated the piloting aid system of FIGS. 2A and 2B, for an arbitrary but advantageous choice of symbology.

The circuitry in FIGS. 2A and 2B is so devised as to cause to be displayed on the screen E of a cathode-ray tube 1 certain at least of the symbols shown in FIG. 3 in bold lines, to wit:

(i) Fixed identification marks, and in particular lines $X_1$ and $X_2$ representing the aircraft's pitch axis $X'$—$X$ and at least one fixed mark, in particular a line $Z_1$ representing the aircraft's yaw axis $Z$—$Z'$; the point of convergence O of the marks $X_1$-$X_2$ and $Z_1$ is therefore the meeting point of the aircraft's pitch and yaw axes, that is, its center of gravity; this is a fixed point representing the origin of the perpendicular axes $X$—$X'$ and $Z$—$Z'$ with respect to which the abscissa X and ordinate Z of each point on display screen E is identified.

Figure 1:
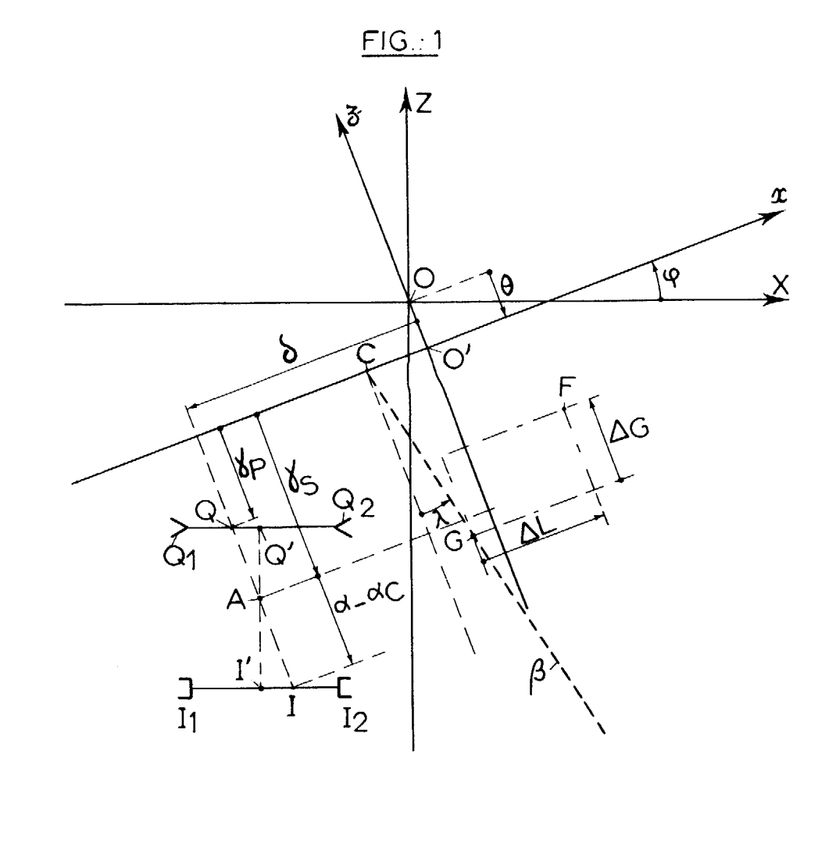
FIG. 1 is a diagram showing the relative positions of the principal symbols formed on the display screen of a piloting aid system according to this invention.

(ii) A mobile horizon line x, with marks perpendicular to it graduated in angular units of heading, the interval between two successive graduation marks being equivalent for example to two degrees; this horizon line x is determined by the fact that its slope to the line $X'$—$X$ representing the aircraft's pitch axis is equal to the aircraft's angle of bank $\phi$ and by the fact that its distance $\overline{O-O'}$ from the point O is proportional to the aircraft's longitudinal inclination or attitude $\theta$ (see also FIG. 1).

(iii) A symbol Ao representing the airplane, such as a small polygon or a small circle centered upon the point A, the abscissa and ordinate of which relative to the axis $O'x$ and the perpendicular axis $O'z$ (FIG. 1) are proportional respectively to the drift angle $\delta$ and the glide slope $\gamma_S$ of the airplane at the instant in question; in this particular embodiment, the airplane symbol Ao is supplemented by two flanking marks $A_1$-$A_2$ which remain invariably parallel to the axis $X'$—$X$.

(iv) Two incidence symbols $I_1$-$I_2$ which appear symmetrically a point I' on the screen, having the same abscissa $X_{I'} = X_A$ as the center A of airplane symbol Ao. As shown in FIG. 1, the point I' has the same ordinate $Z_{I'} = Z_I$ as point I lying on a line parallel to axis $O'z$ and passing through the point A and so chosen that its ordinate $z_I$ with respect to axis $O'z$ differs from the ordinate $z_A$ of point A by an amount proportional to $\Delta\alpha = \alpha - \alpha_c$, which is the difference between the aircraft's incidence $\alpha$ and the incidence $\alpha_c$ corresponding to the reference speed chosen for the aircraft along its trajectory (manifestly), the points I' and I meet in the event of zero angle of bank, that is when $\phi = 0$); in the example considered herein, the two symbols $I_1$-$I_2$ are formed by small rectangles open on their sides remote from point I'; their sides are respectively parallel to the axes OX-OZ and their respective centers (not shown) lie symmetrically on either side of point I', on a line parallel to axis OX.

(v) Two potential-slope symbols $Q_1$-$Q_2$, formed for example by two arrowheads positioned symmetrically with respect to a point $Q'$ of the same abscissa $X_{Q'} = X_A$ as the point A, the straight line $Q_1$-$Q_2$ being likewise parallel to axis OX; as shown in FIG. 1, the point $Q'$ has an ordinate $z_{Q'} = z_Q$ along axis $O'z$ that is equal to the ordinate of a point Q on straight line AI parallel to said axis $O'z$, and the ordinate of point Q along axis $O'z$ is proportional to $$\gamma_P = \gamma_S + \frac{1}{g} \cdot \frac{dV_S}{dt},$$

where $V_S$ is the speed of the aircraft relative to the ground; in this case, also, points Q and Q' meet only in the event of zero angle of bank ($\phi=0$).

(vi) A trapezium $P_1$-$P_4$ whose sides $P_1$, $P_2$ are always parallel to the horizon line O'x, the lengths of its four sides being so chosen that, at any given instant, said trapezium provides a realistic image of a runway as it would be sen at that particular instant by the pilot of the aircraft in normal visibility; it goes without saying that this image is caused to change in the course of the flight so as to remain realistic at all times, as will be explained in greater detail hereinafter.

(vii) The longitudinal axis $\beta$ of the runway is displayed for example in the form of a dash-line upon which are centered the midpoints of the sides $P_1$-$P_2$ of the image of said runway; in the example illustrated in FIG. 3, axis $\beta$ is extended beyond runway $P_1$-$P_4$ both to the lower limit of display screen E and to the point C where it intercepts the horizon line O'x; the orientation of axis $\beta$ is defined by the angle $\gamma$ (FIG. 1) which it forms with the perpendicular to axis O'x dropped from C; in point of fact, as will be explained in greater detail hereinafter, the display position of axis $\beta$ is deduced primarily from the localizer deviation $\Delta L$ and from the glide deviation $\Delta G$, both of which are furnished by an ILS receiver on the aircraft, and accordingly axis $\beta$ coincides substantially with the line of intersection on the ground of the vertical plane through the transmitted ILS "glide path" beam ($\Delta L=0$) and can therefore differ slightly from the geometric symmetry axis defined precedingly.

(viii) The ideal touchdown point G on the axis $\beta$ of runway $P_1$-$P_4$ is identified by two markers $M_1$-$M_2$ which extend, from the runway sides $P_3$-$P_4$, parallel to runway sides $P_1$-$P_2$ and preferably each over a quarter of the apparent width of the runway level with point G.

Figure 4:
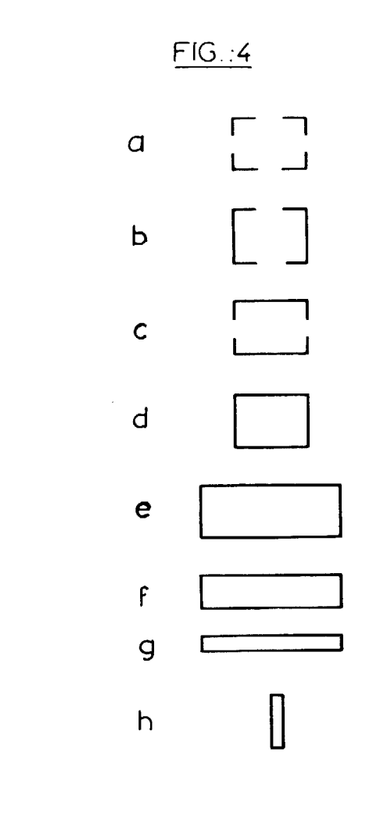
FIG. 4 shows the different shapes which the rectangular flight path guiding window can assume under different flight conditions.

(ix) The center F of the rectangular guidance window for landings with the ILS system has coordinates with respect to axes O'x-O'z which differ respectively from those of the ideal touchdown point G, with respect to the axes, by amounts respectively proportional to the precedingly defined differences $\Delta L$ and $\Delta G$ furnished by the aircraft's onboard ILS receiver (see FIG. 1); as shown in FIG. 3, the two pairs of sides of the rectangular guidance window having a center F have lengths respectively of a and b and are respectively parallel to axes O'x and O'z; the shape and dimensions of said guidance window having a center F are subject to change in the course of the aircraft's flight, as will be explained later with reference to FIG. 4.

(x) Since the axis O'z corresponds to angular coordinate $\theta$, it is likewise possible to display, in solid lines say, parallels to mobile horizon O'x to represent whole-value algebraic angular deviations $\Delta\theta$ such as $+10°$ $+20°$, $-10°$ $-20°$...; FIG. 3 shows only a line $H_{-10}$ the angular deviation of $-10°$ which it represents being displayed at each of its ends adjacent the edges of screen E.

(xi) Alphanumeric information can also be displayed in the manner well-known per se, preferably in the border areas of the screen where it is in no danger of confusing the display; in the example herein considered of a piloting aid for an ILS landing, there is provided in accordance with the present invention a display, for example in the upper left of screen E, the glide slope chosen for the approach to the runway (SFP = $-2.7$ in degrees, for instance), and in the bottom right of screen E the radio altimeter height of the aircraft (H = 650 in feet, for instance), and, at the appropriate moment, the "decision height", namely the altitude of the aircraft at which the pilot must decide whether to proceed with the landing or to abort it (see DH 60 DH information on FIG. 6, which corresponds to a decision height of 60 feet).

The above symbology is by no means limitative.

Identified inside rectangles down the left-hand side of FIG. 2A are the various sensors with which the aircraft is equipped and which deliver on their output terminals possibly analog electrical quantities which are proportional to physical characteristics of the aircraft and of its flight path and which are indispensable to operation of the subject piloting aid of this invention, or at any rate to its form of embodiment herein described.

Of these sensors, the inertial unit CI delivers at its output terminals the aircraft's heading $\psi$, its longitudinal inclination or pitch angle $\theta$, its lateral inclination or roll angle $\phi$, the slope $\gamma_S$ of its flight path relative to the ground, the vertical and horizontal components Jz and Jx respectively of the aircraft's acceleration J, its drift angle $\delta$ and its ground speed $V_s$. As already indicated, the aircraft's ILS receiver furnishes the localizer and glide path deviations $\Delta L$ and $\Delta G$ respectively. A display unit PA placed within reach of the pilot enables him to input manually, into the computer to be described hereinbelow, the runway length RWL, the slope selected for the approach flight path SFP, and the desired corresponding course DTK. A radio altimeter RA furnishes the radio altimeter height H and the decision height DH. An air data generator CA furnishes the aircraft's altitude Zp and indicated air speed $V_i$, that is, its speed relative to the surrounding air; however, these last two data items are not used in the example of an ILS landing to be described hereinbelow, but only for other flight modes. A mode selector unit BA, also placed within reach of the pilot, enables him to input into computer a deviation $\Delta V_R$ from the selected reference speed $V_R$, this deviation being so chosen as to make allowance for example for wind velocity during the approach to the runway; the same selector unit permits of inputting an altitude deviation $\Delta H$, required for assistance during other flight phases. An angle-of-attack sensor SI furnishes the aircraft's incidence $\alpha$. Further, various sensors clustered within unit CO may be provided to deliver, for the purpose of assisting certain flight phases, information relating to the position of the landing-gear (CTE if landing-gear retracted), to the position of the flaps (VAP if extended to approach position, VAT if extended to landing position), and to the position of the "palm switch", that is, the manual throttle control switch placed within reach of the pilot (with "PALM" displayed if the switch is depressed).

Reference is now had to the right-hand part of FIG. 2B for a schematic representation of the display element in the form of a cathode-ray tube 1, on the screen E of which the various symbols described precedingly with reference to FIG. 3 can be displayed in positions defined by their respective coordinates X and Z with respect to the axes defined by the fixed marks $X_1$-$X_2$ and $Z_1$ (FIG. 3), to which coordinates are respectively proportional the voltages applied to the horizontal and vertical deflection elements 1X and 1Z respectively of tube 1. Connected between the outputs from precedingly-defined data sources CI through BA, on the one hand, and deflection 1X and 1Z of cathode-ray tube 1, on the other, is a computer capable of various forms of embodiment. In what follows, a purely analog form of embodiment of such a computer will be described with reference to FIGS. 2A-2B, but it goes without saying that it would alternatively be possible to employ either a universal or dedicated type of suitably programmed digital computer.

The analog computer represented in FIGS. 2A-2B includes the following circuits:

A generator of the horizon line GH, which receives from inertial unit CI electrical quantities proportional to the angular parameters $\psi, \phi, \delta$ of the aircraft and delivers on its two outputs sX-sZ, continuously for example, electrical voltages which, when applied as will be explained in greater detail hereinafter, to deflection elements 1X-1Z of cathode-ray tube 1, display the mobile horizon line O'x (FIG. 3) and its graduation marks in degrees, the origin of this angular scale being fixed, by generator GH, from the heading datum $\psi$. The coordinates of the airplane symbol with respect to the fixed axes OX-OZ, hereinafter designated by $X_A$ and $Z_A$, are determined by a computing circuit $C_1$ from the $\phi$, $\theta$, $\gamma_S$ and $\delta$ data furnished by inertial unit CI, the computing circuit $C_1$ being devised as well-known per se to compute the coordinate transformation corresponding to the following equations, which may be read on FIG. 1:

$$A \begin{cases} X_A = \delta\cos\phi + (\theta + \gamma_S)\sin\phi \\ Z_A = \delta\sin\phi + (\theta - \gamma_S)\cos\phi. \end{cases}$$

In point of fact, prior to being transmitted to the corresponding inputs of computing circuit $C_1$, the quantities $\gamma_S$ and $\delta$ are "smoothed" in two filters $F_1$ and $F_2$ respectively, having the following transfer functions:

$$Tr \begin{cases} \gamma_{SF} = \dfrac{\gamma_S}{1 + \tau_V \cdot p} \\ \delta_F = \dfrac{\delta}{1 + \tau_H \cdot p} \end{cases}$$

where $\tau_V$ and $\tau_H$ are appropriate filtering constants.

The coordinates $X_A$, $Z_A$ furnished by the outputs from computing circuit $C_1$ are transmitted to an airplane symbol generator GA, which delivers on its outputs sX and sZ— continuously for example— electrical voltages which, if applied directly to the deflection elements 1X, 1Z of tube 1, would generate the display on screen E of the symbol Ao (FIG. 3), which could be a small polygon or a small circle centered on a point A of the screen having coordinates XA and ZA.

An adder circuit $AD_1$ produces the difference $(\theta - \gamma_S)$ which is then applied, in parallel with the vertical component $J_z$ of the aircraft's acceleration, to a multiplier circuit $MU_1$ which generates the product $J_z \times (\theta - \gamma_S)$; a second adder circuit $AD_2$, which receives the horizontal component $J_x$ of the acceleration, and a second multiplier circuit $MU_2$ having a constant factor equal to $1/g$, allows computing the potential slope from the equation:

$$\gamma_P = [J_z(\theta - \gamma_S) + J_x]/g$$

A computing circuit $C_2$ which receives the quantities $\phi$, $\theta$, $\gamma_P$ from the output of multiplier $MU_2$ and also the quantity $\delta_F$ determines the ordinate of the point Q (FIG. 1) by applying the following coordinate transforming equation, which is also visible on FIG. 1:

$$Z_Q = \delta \sin \phi + (\theta - \gamma_P) \cos \phi.$$

Since the abscissa and ordinate, with respect to fixed axes OX-OZ, of the symmetry center Q' of potential-slope symbols $Q_1$-$Q_2$ are equal respectively to the abscissa of point A and to the ordinate of point Q (FIG. 1), then transmitting the coordinates of point Q' to a potential-slope symbol generator GP merely requires applying to the input terminals thereof electrical voltages proportional to $X_A$ and $Z_Q$ respectively. As well-known per se, generator GP is effective in generating on its two output terminals $s_X$-$s_Z$, in possibly continuous manner, two electrical voltages such that, if applied to the deflection elements of tube 1, would cause the two symbols $Q_1$-$Q_2$ (FIGS. 1 and 3) to be displayed on the screen thereof in positions symmetrical with respect to Q'.

In order to generate the incidence symbols $I_1$, $I_2$ (FIG. 3), it is manifestly necessary to form the difference $(\alpha - \alpha_c)$ between the aircraft's angle of attack or incidence $\alpha$ furnished by the incidence sensor SI and the preset incidence $\alpha_c$, this being accomplished in an adder circuit $AD_3$. It is to be noted that the preset incidence $\alpha_c$ depends on the reference speed $V_R$ chosen for the aircraft's approach flight; however, as already stated, the mode-selector unit BA enables the pilot to introduce a deviation $\Delta V_R$ with respect to the reference speed, for instance in order to allow for wind velocity, this occurring during the landing phase which precedes the ultimate phase when, having reached a particular altitude $H_A$ of, say, 70 feet, the aircraft must depart from its linear descending flight path toward the runway in order to initiate the final flare-out prior to touchdown. To this end, the information $\Delta V_R$ from unit BA is transmitted to a first input of a logic circuit $ET_1$ the other input of which receives a signal from a threshold circuit or a comparator $S_1$ only if the height H furnished by radio altimeter RA is greater than $H_A$. The electrical output of logic circuit $ET_1$ is connected to the electrical input of a multiplier circuit $MU_3$ which, in order to multiply $\Delta V_R$ by the factor $2\alpha_{ref}/V_R$ (where $\alpha_{ref}$ is the reference incidence angle for the approach phase), receives on its two other inputs the selected reference speed $V_R$ and the reference incidence angle $\alpha_{ref}$, respectively. This latter quantity is also transmitted, in parallel with the output voltage from multiplier circuit $MU_3$, to the inputs of an adder circuit $AD_4$ which delivers to adder circuit $AD_3$, in parallel with the incidence angle $\alpha$, an electrical voltage proportional to the set-value incidence $\alpha_c$ such that:

$$\alpha_c = \alpha_{ref} + 2\Delta V_R \cdot \frac{\alpha_{ref}}{V_R}$$

The output voltage from adder circuit $AD_3$, which is proportional to $(\alpha - \alpha_c)$, is then applied to the electrical input of a filtring circuit $F_3$ the transfer function of which corresponds to $$\Delta\alpha = \frac{\alpha - \alpha_c}{1 + \tau\alpha \cdot p}.$$

where $\tau\alpha$ is an appropriate time constant. The output voltage from filter $F_3$, which is proportional to $\Delta\alpha$, is then applied to the electrical input of a weighting circuit $CP_1$ which multiplies $\Delta\alpha$ by a proportionality coefficient K which goes increasing with $\Delta\alpha$, at any rate above a certain value thereof. In the embodiment considered herein, proportionality coefficient K can assume two different values, of which one is notably greater than the other for high positive values of $\Delta\alpha$, as indicated schematically by the weighting curve represented inside the rectangle representing weighting circuit $CP_1$. The output voltage from circuit $CP_1$ is proportional to the difference between the ordinates of points I and A with respect to the axes O'x–O'z (FIG. 1). This output voltage, which is proportional to $(z_I-z_A)$, is transmitted to the electrical input of a multiplier circuit $MU_4$ the other electrical input of which receives the voltage proportional to the roll angle $\phi$, multiplier circuit $MU_4$ being effective, in the manner well-known per se, in generating the product of its input voltage times cos $\phi$ in order that its output voltage be itself proportional to the difference $(Z_{I'}-Z_A)$ between the ordinates of point I' and A with respect to the fixed axis OZ (see FIG. 1). This output voltage is applied to one electrical input of an adder circuit $AD_5$ the other input of which receives the ordinate $Z_A$ from the corresponding output terminal of computing circuit $C_1$. The other output from circuit $C_1$ and the output from adder circuit $AD_5$ transmit the coordinates $X_{I'}=X_A$ and $Z_{I'}$, respectively, to the two electrical inputs of an incidence symbol generator GI. Generator GI is effective in producing, on its two output terminals sX and sZ, two voltages such that, if applied respectively to the deflection elements of cathode-ray tube 1, would cause to be displayed on the screen E thereof two incidence symbols $I_1-I_2$ in positions symmetrical in relation to the point I', as shown in FIGS. 1 and 3.

Further, the glide slope deviation $\Delta G$, the information on the selected slope SFP, and the radio altimeter height H are transmitted in parallel to the electrical inputs of a computing circuit $C_3$ that generates on its output a voltage proportional to the instantaneous distance g between the center of gravity of the aircraft and the ideal touchdown point G (FIG. 3). This distance g which is a function of $\Delta G$, SFP and H, is also transmitted, in parallel with the localizer deviation $\Delta L$, to another computing circuit $C_4$ which generates, respectively on its three electrical outputs, the coordinates $X_G$ and $Z_G$ of point G with respect to the fixed axes and the angle $\lambda$ which the runway axis $\beta$ forms with the perpendicular to horizon line O'x. In order to enable these parameters to be determined, the RWL information is likewise transmitted to circuit $C_4$ from selection unit PA. The three output quantities $X_G$, $Z_G$ and $\lambda$ from computing circuit $C_4$ are transmitted, in parallel with the roll angle $\phi$, to the electrical inputs of a localizer axis generator GLL the two outputs sX and sZ of which generate, continuously for example, two voltages which, if applied directly to the deflection elements of cathode-ray tube 1, would cause the axis $\beta$ of runway $P_1-P_4$ to be generated in a dash-line on screen E.

The four sides $P_1$ through $P_4$ of the distortable trapezium for realistically simulating the runway are displayed through the agency of a runway shaping circuit CCP to which are applied the three parameters issuing from computing circuit $C_4$ and a quantity $H_C$ derived from the radio altimeter height H by another weighting circuit $CP_2$, the possible configuration of the transfer curve of which is shown schematically inside the rectangle representing unit $CP_2$. The runway shaping circuit CCP has a plurality of output terminals electrically connected to the respective input terminals of a runway generator GPi. Generator GPi has two outputs sX, sZ on which are generated, continuously for example, two voltages which, if applied directly to the deflection elements of cathode-ray tube 1, would cause to be displayed thereon the four sides of trapezium $P_1-P_4$ to simulate the runway and the two markers $M_1$, $M_2$.

The ILS guidance window, of center F, is itself generated by a window generator GF, to the various input terminals of which are applied, in parallel, the roll angle $\phi$, the coordinates $X_G-Z_G$ of the ideal touchdown point G, and the deviations $\Delta L$ and $\Delta G$ furnished by the ILS receiver, a gain $K_L$ being however applied to the deviation $\Delta L$ by an amplifier $A_L$. In addition, $\Delta G$ is itself multiplied by a gain $K_G$ which varies with the radio altimeter height H and is produced by a weighting circuit $CP_3$. The input terminal of weighting circuit $CP_3$ receives the radio altimeter height H only from the output terminal of threshold circuit $S_1$, which is activated only if H is greater than $H_A$ (the flare-out height). The radio altimeter height H is also applied directly to another input terminal e of window generator GF in order to authorize the changes of shape and dimensions of the guidance window during the final phases of an ILS landing, as will be explained in greater detail hereinafter.

An alphanumeric symbol generator GAN has at least three electrical inputs to which are respectively applied, through logic circuits of the AND type, the SFP and H data and a signal delivered by an output from a threshold circuit $S_2$, the inputs of which receive in parallel the H and DH data from the radio altimeter and the said output of which is activated only if H is less than or equal to the decision height DH.

As shown on the right-hand part of FIG. 2B, the output terminals sX–sZ of each of symbol generators GH, GP, GA, GI, GLL, GPi and GF are connected respectively to the first input terminals of logic circuits $ET_2$ through $ET_{13}$ and $ET_{15}$ and $ET_{16}$. Three other logic circuits $ET_{14}$, $ET_{17}$ and $ET_{18}$ respectively receive on their first input terminals the data SFP and H and the output signal from threshold circuit $S_2$, which signal is generated when H becomes less than or equal to the decision height DH. The second input terminals of the various logic circuits are connected, in pairs in the case of $ET_2$ through $ET_{13}$ and $ET_{15}$ and $ET_{16}$ and separately for $ET_{14}$, $ET_{17}$ and $ET_{18}$, in parallel respectively to the nine outputs of an electronic clock HE, on which outputs said clock successively produces nine short pulses for triggering the corresponding AND logic gates at regularly spaced instants within a recurrence period T less than or at most equal to the time of persistence of the signals displayed on the screen E of cathode-ray tube 1. Since the output terminals of logic circuits $ET_{14}$, $ET_{17}$ and $ET_{18}$ are connected to distinct input terminals for controlling alphanumeric generator GAN, the same is effective in successively displaying the parameters SFP, H and DH at locations on screen E that have been predetermined in the manner, say, indicated precedingly. Since furthermore the outputs from logic circuits ET$_2$ through ET$_{13}$ and ET$_{15}$, ET$_{16}$, together with the outputs sX and sZ from alphanumeric generator GAN, are recombined by two OR-type logic circuits OU$_X$ and OU$_Z$ having their respective output terminals connected to deflection elements 1X and 1Z of cathode-ray tube 1 through appropriate amplifiers A$_X$ and A$_Z$, it will be appreciated that, for each recurrent cycle of electronic clock HE, the two logic gates, for example ET$_2$ and ET$_3$, associated respectively to the outputs sX and sZ of one of the symbol generators, GH, are enabled simultaneously, for each symbol generator in succession, whereby, in the course of such a cycle, the various symbols X$_1$-X$_2$-Z$_1$, O'x and its graduation A$_0$-A$_1$-A$_2$, Q$_1$-Q$_2$, I$_1$-I$_2$, $\beta$, P$_1$-P$_4$, M$_1$-M$_2$, along with the alphanumeric information −2.7 and 650 (FIG. 3) and DH60 DH (FIG. 6), are displayed in succession on screen E but remain simultaneously visible throughout the period T owing to the afterglow of screen E. Obviously, the display is updated during subsequent cycles of electronic clock HE.

It is proposed next to describe the manner of operation and utilization of the subject piloting aid of this invention described hereinbefore, for the case of an approach and landing on a runway equipped with an ILS system.

During the approach phase, before the aircraft's ILS receiver receives signals from the runway, the window with its center F is used to provide rough guidance, particularly with respect to course and altitude, and in this instance the window is displayed with open sides, as shown at a in FIG. 4. As soon however as the localizer signal, for example, is received by the aircraft's ILS receiver with sufficient strength, the window provides guidance along the localizer beam, and in this situation the two vertical sides of the displayed window are closed, as shown at b in FIG. 4; if on the other hand the glide slope signal is received first with sufficient strength, the window will provide guidance in the 'glide slope' mode, in which case the two horizontal sides of the displayed window will be closed, as shown at c in FIG. 4. When the 'localizer' and 'glide slope' signals are received simultaneously by the ILS receiver, the window of center F, which will then provide landing guidance in the ILS mode, is displayed in the form of a rectangle with unbroken sides, as shown at d in FIG. 4. This is precisely the phase, corresponding to the landing proper, that will now be described in detail.

In order to use to full advantage the landing aid of the present invention described hereinabove, the pilot of the aircraft must endeavor to direct the airplane symbol A$_o$ and hold it inside the guidance window of center F, the position of which on screen E obviously changes as the flight proceeds. The window, two of whose sides remain constantly parallel and the others perpendicular to the mobile horizon line O'x, in fact corresponds substantially to the section, taken by the fixed transverse plane XOZ of the aircraft, through a guidance beam issuing from ideal touchdown point G on runway axis $\beta$, the transverse dimensions a and b of the beam being predetermined so as to correspond to the permissible limit values of deviations ΔL and ΔG. The window consequently shifts at the same time as the aircraft in relation to the runway, just as its orientation depends on that of the mobile horizon line O'x, or in effect on the aircraft's angle of bank $\phi$. This is not so however in the case of the two marks A$_1$-A$_2$ flanking the airplane symbol A$_o$, which are always parallel to the fixed axis OX, or pitch axis of the aircraft. Manifestly, it is by means of the flight controls that the pilot endeavors to maintain the symbol A$_o$ inside the guidance window; however, this is a comparatively easy task, particularly since it is not essential to keep the airplane symbol A$_o$ exactly in the center F of the window, as is the case with prior-art piloting aids in which the guidance element is represented by a point—usually the point of intersection of two lines. In other words, the piloting aid according to this invention will provide sufficiently accurate guidance as long as the airplane symbol A$_o$ remains inside the window, even if it is near one of the sides thereof; obviously, however, the pilot should attempt to minimize the distance between airplane symbol A$_o$ an window center F in order to achieve the most accurate possible guidance.

Further, in order that the aircraft should retain the selected speed V$_R$+ΔV$_R$, the pilot must try to continuously maintain the potential-slope symbols Q$_1$, Q$_2$ level with the incidence symbols I$_1$, I$_2$. This can be accomplished with the throttle control for controlling the aircraft's piston engines or the thrust of its jet engines.

FIG. 6 corresponds to the ideal situation in which, by operating the aircraft's control surfaces and the throttle lever, the pilot has succeeded in positioning the airplane symbol in the center of the rectangular guidance window and in causing the two pairs of potential-slope and incidence symbols to register exactly with each other and level with the airplane symbol. In this situation, $\gamma_P=\gamma_S$, resulting in constancy of the speed V$_S$ of the aircraft relative to the ground, and also $\alpha=\alpha_C$, that is to say that the angle of attack or incidence of the aircraft is equal to the set-value corresponding to the reference speed V$_R$, possibly corrected for the deviation ΔV$_R$ to allow for wind velocity as explained precedingly.

Stress must be laid here on the advantage, as a piloting aid, in the use in accordance with the present invention of potential-slope symbols such as Q$_1$, Q$_2$ and incidence symbols such as I$_1$, I$_2$, in conjunction with the airplane symbol of coordinates δ and $\gamma_S$. As will have been appreciated earlier for the situation illustrated in FIG. 6, the pilot can read immediately on screen E that the aircraft is flying at constant speed—since $\gamma_P=\gamma_S$ and hence $dV_S/dt=0$—and with decreasing altitude ($\gamma_S$ being negative). In level flight the speed is likewise constant, the airplane symbol A$_o$ and the potential-slope symbols Q$_1$, Q$_2$ being then aligned on the mobile horizon line O'x. If in the same situation of flight at constant altitude—with airplane symbol A$_o$ on horizon line O'x—the symbols Q$_1$, Q$_2$ were to lie below said horizon line, then the pilot would deduce from this that the aircraft's speed is diminishing (since $\gamma_S=0$ and $\gamma_P=(dV_S/dt)/g$ negative). In the converse situation wherein the potential-slope symbols Q$_1$ and Q$_2$ are aligned on the horizon line with the airplane symbol A$_o$ above it, the pilot would deduce from this that the aircraft's altitude is increasing—since $\gamma_S$ is positive—with the aircraft's speed decreasing at a negative rate $dV_S/dt=-g\cdot\gamma_S$. Whenever the pilot notes the incidence symbols I$_1$, I$_2$ level with airplane symbol A$_o$, he may deduce from this that the aircraft's incidence angle is equal to the set-value $\alpha_C$ corresponding to the chosen reference speed V$_R$, possibly corrected for the deviation required to allow for wind velocity. If on the contrary the incidence symbols I$_1$, I$_2$ are displayed below airplane symbol A$_o$, the inference is that the instantaneous incidence angle $\alpha$ is less than the set incidence value $\alpha_C$ and that consequently the aircraft's speed is greater than the chosen reference speed. The opposite holds if the incidence symbols $I_1$, $I_2$ are displayed above airplane symbol $A_o$.

Figure 5:
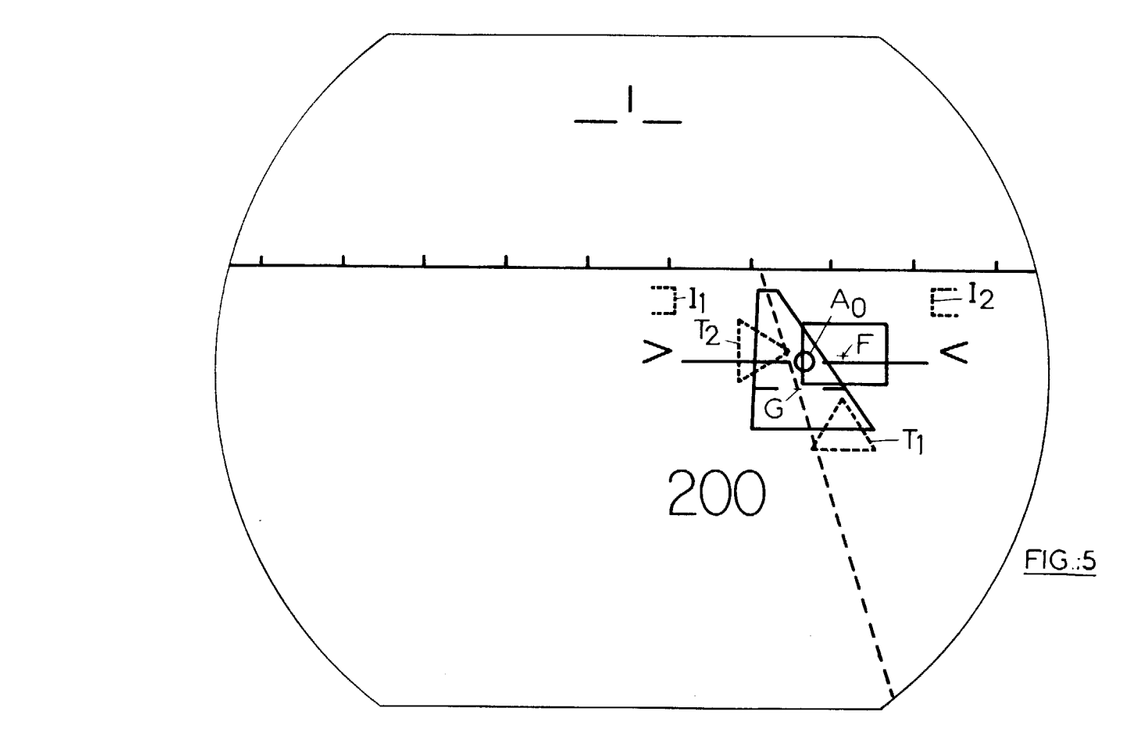
FIG. 5 shows the display screen and the symbols which appear thereon during the approach to a runway equipped with an ILS system.

If on the contrary the pilot fails to maintain the airplane symbol $A_o$ completely inside the guidance window of center F, as illustrated in FIG. 5, the aircraft will deviate from the set flight path corresponding to an ILS landing, and consequently the ideal touchdown point G on the runway axis will also fall outside the guidance window. For such a situation, auxiliary means not shown in FIGS. 2A-2B but which may consist essentially of threshold circuits receiving the output signals $\Delta L$ and $\Delta G$ from the ILS receiver cause warning signals to be displayed externally of and in proximity to those sides of the guidance window nearest the point G, for instance in the shape of a triangle $T_1$ having its base parallel to the horizon line and its apex close to the middle of the lower side of the window and a triangle $T_2$ having its base perpendicular to the horizon line and its apex close to the middle of the left-hand side of the window. The pilot's attention can be drawn to these warning signals by displaying in dash-lines and/or causing them to flash on and off at an appropriate rate. FIG. 5 also shows that if the aircraft's incidence becomes too great and hence its ground speed too low, the incidence symbols $I_1$-$I_2$, which will then be very close to the horizon line, can be displayed in dash-lines and/or caused to flash at an appropriate rate.

When the radio altimeter height H of the aircraft becomes equal to sixty feet, the alphanumeric generator causes the indication "DH60 DH" to appear beneath the guidance window on screen E, as shown in FIG. 6. This is the point in time when the pilot must decide to continue the landing procedure provided that all the requirements illustrated in FIG. 6 are met, namely that not only are the potential-slope and incidence symbols aligned with the airplane symbol, with the latter itself lying inside the guidance window, but also the guidance window must have its center as close as possible to the runway axis $\beta$. If one or more of these requirements is not met, the pilot must abort the landing and effect a go-around. When the aircraft reaches a height of twenty-five feet (FIG. 7), the window generator GF, being influenced directly by the H-information from the radio altimeter, reduces the height of the window as shown at e in FIG. 4 and in FIG. 7. Further reductions in the height of the window occur subsequently, as for example at altitudes of twenty feet (FIG. 8) and ten feet (FIG. 9). FIGS. 6 through 9 clearly show the pattern of evolution of the shape of the runway image as the aircraft approaches down a vertical plane through its fore-aft axis perpendicular to the horizon (assuming a zero roll angle).

When the radio altimeter height H of the aircraft becomes less than a predetermined height $H_4$ beyond which the flight path ceases to be straight as the flare-out is executed prior to touchdown on the runway axis, threshold circuit $S_1$, which is then activated, transmits, through the agency of a shaping circuit $CP_4$, an appropriate signal to the input terminal e of incidence symbol generator GI, thereby rendering the position of incidence symbols $I_1$-$I_2$ independent of the incidence deviation $\Delta\alpha$, whereby the symbols thereafter remain fixed in relation to the fixed marks $X_1$-$X_2$-$Z_1$. This same signal is also used to provide a controlled reduction in the thrust of the aircraft engines.

When the wheels of the aircraft touch the ground, window generator GF completely alters the shape of the displayed window, making it higher than wider as shown in FIG. 4 at h and in FIG. 10. The signal $\Delta L$ produced by the ILS receiver on the aircraft is then used to guide the aircraft as it rolls along the runway axis $\beta$. At the same time, alphanumeric generator GAN displays the remaining runway length (such as 2150 meters in FIG. 10) on the basis of the RWL information which generator GAN receives via an input e.

FIG. 11 shows the display which the pilot sees when, having reached the decision height DH, he decides to abort the landing and he operates the "palm switch" to reopen the engine throttles. In that event the sides of the guidance window will be open and correspond to low-accuracy course and altitude guidance, with the pilot endeavoring to maintain the airplane symbol level with the center of the window, along with the potential-slope symbols. A brief glance at the display shown in FIG. 11 will tell the pilot that the aircraft is at a radio altimeter height $H = 340$ feet and climbing at a constant rate.

As stated precedingly, the cathode-ray tube 1, which is the display element in the form of the embodiment hereinbefore described, is installed in the cockpit. Optical means well-known per se are preferably provided to project an image of the cathode-ray tube screen E before the pilot's eyes, in a position such that the mobile horizon line O'x and the changing image of the runway $P_1$-$P_4$ coincide substantially with the horizon and the runway which the pilot sees through the aircraft's windshield. Thus, particularly when visibility is good, the pilot does not need to be distracted from the background environment visible through the windshield in order to monitor, as often as possible, the changes in the information displayed on screen E since this information is projected as an overlay on the visible environment. This consequently permits 'head-up' piloting.

It goes without saying that the present invention is by no means limited to the form of embodiment hereinbefore described and that many changes and substitutions may be made without departing from the scope of the invention. For instance, the display tube 1 may have a plurality of electron beams, each assigned to displaying one or more of the symbols referred to precedingly. The cathode-ray tube itself could be replaced by any other suitable display means such as a matrix of light-emitting diodes, or by any other flat display element. Obviously, recourse could be had to color display means enabling the various required symbols to be displayed with different colors. Further, both the shape and the dimensions of the various symbols, such as those shown in FIG. 3, are a matter of choice, and indeed certain of these symbols could be dispensed with. The same applies to the different kinds of alphanumeric information displayed. Indication of the longitudinal inclination of attitude $\theta$ of the aircraft on display screen E is optional, and in its absence the mobile horizon line O'x would swing about the point of convergence O of marks $X_1$-$X_2$ and $Z_1$. Similarly, display of the angle of bank or roll angle $\phi$ of the aircraft can be dispensed with, in which case the horizon line O'x would become fixed and coincide with fixed axis OX (FIG. 3). In the case of an aircraft devoid of an inertial system, circuitry well-known per se can be provided to compute the components along the pitch and yaw axes of the aircraft's ground speed. It goes without saying that the subject piloting aid of this invention can be installed on any type of aircraft to assist in piloting the same; alternatively, it could be installed in a piloting simulator.

We claim:

1. A piloting aid system for aiding in piloting or in simulating the piloting of an aircraft, comprising:
   a display unit having a display screen and means for displaying on said display screen symbols representative of a plurality of determined flight and environmental characteristics of said aircraft;
   means for determining drift angle $\delta$ and a slope relative to ground $\gamma_S$ of a flight path of said aircraft;
   means for displaying a symbol representing said aircraft near a point having an abscissa and an ordinate on said display screen, said abscissa and said ordinate of said point with respect to two mutually perpendicular axes on said display screen being respectively proportional to the determined values of $\delta$ and $\gamma_S$; and
   means for displaying a guidance symbol for the aircraft flight path comprising a rectangular guidance window having pairs of sides respectively parallel to said mutually perpendicular axes.

2. A piloting aid system as claimed in claim 1, further comprising an inertial guidance device mounted on said aircraft and wherein the drift angle $\delta$ and the slope relative to ground $\gamma_S$ of said aircraft flight path are derived from said inertial guidance device mounted on said aircraft.

3. A piloting aid system as claimed in claim 1, further comprising:
   means for determining an actual incidence $\alpha$ of said aircraft and aircraft speed $V_S$ relative to ground;
   means to select an aircraft reference speed;
   means to compute a difference $\Delta\alpha$ between a determined value of the aircraft actual incidence and an incidence corresponding to said aircraft reference speed;
   means for displaying near said symbol representing said aircraft at least one aircraft incidence characterizing symbol, the difference between the ordinate of said aircraft incidence symbol and that of said symbol representing said aircraft being equal to a product $K\Delta\alpha$, wherein K is a proportionality coefficient; and
   at least one potential-slope characterizing symbol the ordinate of which is proportional to $$\gamma_P = \gamma_S + \frac{1}{g} \cdot \frac{dV_s}{dt},$$

where g is the intensity of the force of gravity and dVs/dt is the time differential of said aircraft speed $V_s$ representing acceleration of said aircraft.

4. A piloting aid system as claimed in claim 3, wherein said proportionality coefficient K comprises a variable coefficient means increasing with said difference $\Delta\alpha$, at least above a certain value of said difference $\Delta\alpha$.

5. A piloting aid system as claimed in claim 3, further comprising:
   means for determining an aircraft longitudinal inclination $\theta$, and horizontal and vertical components, $J_x$ and $J_z$, respectively, of aircraft acceleration; and
   a plurality of circuits for computing said potential slope from an equation $\gamma_p = [J_z(\theta - \gamma_s) + J_x]/g$.

6. A piloting aid system as claimed in claim 3, further comprising:
   means for determining a roll angle $\Psi$ of said aircraft;
   means for displaying a plurality of stationary marks for representing a pitch axis and a yaw axis of said aircraft; and
   means for displaying a drift angle $\delta$ axis in the form of a mobile graduated horizon line forming an angle with said pitch axis which is equal to the determined value of said roll angle $\Psi$, the distance between said horizon line and the point of convergence of said stationary marks being proportional to a longitudinal inclination $\theta$ of said aircraft.

7. A piloting aid system as claimed in claim 3, further comprising means for displaying a realistic time-evolving image of a runway as said runway would normally be seen by a pilot of said aircraft.

8. A piloting aid system as claimed in claim 7 for aiding in landing or in simulating landing of said aircraft on a runway equipped with an instrument landing system or like system, further comprising:
   means for determining coordinates of an ideal touchdown point on said runway;
   means for further displaying an axis of said runway passing through said ideal touchdown point; and
   means for displaying said rectangular guidance window during instrument landings, said guidance window comprising a center point having coordinates differing from those of said ideal touchdown point by amounts respectively proportional to a localizer-beam deviation and a glide-slope deviation, wherein both of said deviations are derived from an instrument landing system receiver on board said aircraft.

9. A piloting aid system as claimed in claim 7, wherein said display screen is installed in a cockpit of said aircraft and optical means are provided for projecting said display screen to infinity before a pilot's eyes, in a position such that said mobile graduated horizon line and said time-evolving image of said runway coincide substantially with an actual horizon and runway seen by said pilot through a windshield of said aircraft.

10. A piloting aid system as claimed in claim 1, further comprising means for changing the shape or dimensions of said rectangular guidance window in accordance with successive phases in the flight of said aircraft such as cruise flight, runway approach, and successive phases in an instrument landing system landing.

11. A piloting aid system as claimed in claim 1, wherein said display unit comprises a cathode-ray tube.

* * * * *